Patented Dec. 6, 1938

2,139,120

UNITED STATES PATENT OFFICE 2,139,120

PROCESS FOR THE PRODUCTION OF NITROHYDROXY COMPOUNDS

Henry B. Hass, West Lafayette, and Byron M. Vanderbilt, Terre Haute, Ind., assignors to Purdue Research Foundation, La Fayette, Ind., a corporation of Indiana No Drawing. Application June 7, 1937, Serial No. 146,852

10 Claims. (Cl. 260—632)

Our invention relates to the production of nitrohydroxy compounds by the reaction of nitrohydrocarbons and aldehydes. More specifically, our invention relates to the use of improved catalysts for the reaction of nitrohydrocarbons and aldehydes to produce nitrohydroxy compounds.

It has previously been known that nitroparaffins and aliphatic aldehydes could be reacted in the presence of an alkali metal catalyst to produce nitroalcohols or nitroglycols. According to this process one molecule of aldehyde may be added to the nitroparaffin at each hydrogen atom attached to the carbon atom to which the nitro group is attached. Thus it is possible to produce a trihydroxy compound from nitromethane, a dihydroxy compound from other primary nitroparaffins, and only a monohydroxy compound from a secondary nitroparaffin. In the past these reactions have been carried out in the presence of soluble alkali metal catalysts, but these catalysts have had certain disadvantages such as their tendency to induce aldehyde condensation reactions and the difficulty of their removal from the final reaction mixture.

We have now discovered that the alkaline earth hydroxides are suitable catalysts for this type of reaction and possess a number of advantages over catalysts previously employed even though they are relatively less soluble than the alkali metal hydroxides. We have discovered that the alkaline earth hydroxides react with the nitroparaffins to form salts which are more soluble than the hydroxides, and which enable a sufficient concentration of the catalyst to be introduced into the reaction mixture. The use of these materials as catalysts substantially reduces the tendency of the aldehyde to condense or polymerize, and thus increases the yield of nitrohydroxy compounds over that obtainable when alkali metal catalysts are used. These catalysts are also advantageous from the standpoint of preferentially inducing the formation of monohydroxy compounds from primary nitroparaffins when the proportion of the reactants favors this reaction. An outstanding advantage of the use of the alkaline earth hydroxides as catalysts in the ease of their removal from the final reaction mixture. When employing alkali metal catalysts, it is necessary to recover the nitrohydroxy compounds by distillation or crystallization in order to separate the catalysts. However, when employing the alkaline earth hydroxides, the catalyst may be precipitated by introducing an equivalent amount of an acid which will form an insoluble salt, and the nitrohydroxy compound can thus be recovered free from the catalyst simply by filtration.

When employing the catalysts of our present invention, we prefer, in general, to follow the procedure outlined in co-pending application Serial No. 146,855, filed June 7, 1937. According to this process the nitroparaffin is maintained in a concentration slightly in excess of the theoretical throughout the reaction, a relatively low reaction temperature is employed, and the reaction mixture is maintained in a single phase system to minimize the formation of aldehyde condensation products. An auxiliary solvent, such as methyl or ethyl alcohol, is utilized in this procedure to maintain the reaction mixture in a single phase, and is preferably used only in the minimum concentration necessary to effect this end. The reaction temperature is maintained at a point sufficiently low to prevent substantial condensation of the aldehyde employed, and the safe maximum limits of temperature have been found to be approximately 50° C. in the case of formaldehyde, and 40° C. in the case of higher aldehydes.

When employing the catalysts of the present invention, the single phase procedure described above may be effected by dissolving the catalyst in a small amount of the nitroparaffin to be reacted, together with sufficient water and auxiliary solvent to maintain a single phase system at this point. The nitroparaffin and aldehyde can then be introduced into the resulting mixture, with agitation, in proportions such that the nitroparaffin is slightly in excess of the theoretical concentration throughout the major portion of the reaction.

We have found, however, that a further advantage of the use of the catalysts of the present invention is the fact that these catalysts do not tend to produce substantial aldehyde condensation, even in the case of two phase systems in which the aldehyde and catalyst are concentrated in the aqueous layer. It is thus possible to eliminate the use of the auxiliary solvent and employ an aqueous solution of the alkaline earth hydroxide. In this case the nitroparaffin and an aqueous suspension of the alkaline earth hydroxide are agitated until the catalyst is completely in solution, and the aldehyde is then introduced into this mixture with continued agitation.

In carrying out the reactions according to the procedures discussed above the proportions of reactants will, of course, depend upon the type of nitrohydrocarbon employed and the desired product. If it is desired to produce a nitroalcohol, theoretically 1 mole of aldehyde should be employed per mole of nitroparaffin, and this will be found to be satisfactory in the case of secondary nitroparaffins since a nitroalcohol is then the only possible product. However, when employing the primary nitroparaffins, nitroalcohols and nitroglycols tend to be produced in an equilibrium mixture, and in this case it is desirable to utilize an excess of nitroparaffin if the nitroalcohol is the desired product. Conversely, if a nitroglycol is desired, two moles of aldehyde per mole of nitroparaffin should be employed and a slight excess of aldehyde may suitably be used.

The concentration of the catalyst to be employed will depend to some extent upon the particular reaction, since the various types of nitroparaffins do not react with equal ease. Thus, a higher concentration of catalyst is required for the reaction of a secondary nitroparaffin than is necessary in the case of a primary nitroparaffin. However, we have found that in general a concentration of from 0.05% to 0.5% of catalyst based on the total weight of the reaction mixture will be satisfactory. The amount to be used in any given case should be maintained at the minimum for satisfactory production of the nitrohydroxy compound, since any excess will tend to increase aldehyde condensation reaction. In any given case simple preliminary experiments will readily determine the optimum amount to be employed.

In carrying out the reaction according to either of the procedures discussed above, a reaction vessel is utilized which is equipped with cooling means and agitating means. Thorough agitation is effected throughout the addition of the aldehyde, and the temperature is preferably maintained between 30° C. and 35° C. In the case of formaldehyde an aqueous solution may be utilized, or the material may be introduced in the gaseous form, or even in the solid state as para-formaldehyde, if introduced gradually and thoroughly dispersed. The higher aldehydes may simply be introduced in their liquid state. If the initial temperature is substantially below 30° C., vigorous reaction may not be attained during addition of the aldehyde, in which case it would be necessary to raise the temperature to 30–35° C., and maintain it at this point until the primary reaction is complete. In most cases the course of the primary reaction may be followed by the tendency of the temperature to rise due to the exothermic nature of the reaction. External cooling should be utilized to maintain the optimum temperature of 30–35° C. during this period. In this initial stage of the reaction the conversion to the nitrohydroxy compound is not quite completed, and for optimum conversion it is necessary to allow the mixture to stand at reaction temperature for a number of hours and, preferably, from 1 to 3 days. However, in a semi-continuous process the degree of conversion obtained in the initial stage may be found to be sufficient, if means are utilized to remove unreacted aldehyde and/or nitroparaffin without encountering losses by condensation.

At the conclusion of the reaction the catalyst is precipitated by the addition of an equivalent amount of an acid which will form an insoluble salt and the precipitate may then be separated from the reaction mixture by filtration or other suitable means. Thus, carbon dioxide or oxalic acids may be utilized in the case of all of the alkaline earth catalysts, sulphuric acid may be used in the case of the barium or strontium catalysts, and chromic acid in the case of the barium catalysts. In general, an excess of the acid is to be avoided since the presence of the acid in the solution after the removal of the precipitated catalyst may have a detrimental effect on the recovery of the nitrohydroxy compound from the reaction mixture. Thus, any excess acid tends to induce undesired reactions and reduce the recovery if unreacted aldehyde and nitroparaffin are removed by distillation. Likewise, any excess acid, or any soluble salt formed by the presence of excess acid, would be undesirable in the nitrohydroxy compound if the latter were not further purified. We, therefore, prefer to exactly neutralize the catalyst for the precipitation step. This may be accomplished by the use of the exact equivalent amount of a non-volatile acid, or by the use of a slight excess of carbon dioxide. For precipitating the catalyst we generally prefer to utilize carbon dioxide as the precipitating agent but it is to be understood that any acid may be employed which will form an insoluble salt with the catalyst. The nitrohydroxy compound may be further separated from the reaction mixture and purified by fractional distillation, crystalization or other suitable method.

The following specific examples illustrate the application of our invention to the production of various nitrohydroxy compounds:

*Example I*

35.6 parts by weight of 1-nitropropane and an aqueous suspension of 0.1 part of hydrated lime was placed in a vessel equipped with external cooling means, and thoroughly agitated to effect solution of the lime. Formalin solution (37.5% HCHO) was then slowly introduced with continued agitation until 65.3 parts had thus been added. During the addition temperature rose to 30° C. and was maintained at this point by external cooling. After addition of approximately one-half of the formalin, the reaction mixture became a single phase and remained in this state during the addition of the remainder of the formalin. At the conclusion of the addition of the formalin the mixture was allowed to stand without further agitation for 43 hours. Carbon dioxide was then introduced in slight excess, after which the product was filtered to remove the precipitated calcium carbonate. A yield of 59.4 parts of 2-ethyl-2-nitro-1,3-propanediol was secured, constituting 99% of the theoretical yield.

*Example II*

The procedure of Example I was followed utilizing the following reactants: 309 parts by weight of 1-nitrobutane, 460 parts of formalin (39.1% HCHO) and 2.0 parts of Ca(OH)$_2$. The reaction mixture became a single phase after the addition of approximately 60% of the formalin. After addition of the formalin was complete, the reaction mixture was allowed to stand for 48 hours without further agitation. At the end of this time some large crystals of the nitroglycols had formed. The mixture was then heated to 50° C. and the lime was removed by the introduction of carbon dioxide, and filtering. By cooling the filtrate to 10° C. and filtering 405 parts of 2-nitro-2-propyl-1, 3-propanediol were obtained. On evaporation of the filtrate to remove the volatile solvents a yellow residue was obtained. On dissolving this in an equal volume of water and cooling to 0° C., an additional 43 parts of nitroglycol were obtained, giving a total yield of 92% of the theoretical.

*Example III*

The procedure of Example I was followed utilizing the following reactants: 300 parts by weight of nitroethane, 650 parts of formalin (36.2% HCHO). In this case 1.4 parts of hydrated lime were utilized. At the conclusion of the initial reaction the mixture was allowed to stand for three days without further agitation, after which carbon dioxide was introduced in slight excess and the resultant calcium carbonate was removed by filtration. The resulting solution was evaporated under reduced pressure to effect crystallization, and the product was then recrystallized from a toluene-butyl alcohol solution. A yield of 478 parts of 2-nitro-2-methyl-1, 3-propanediol was secured, constituting 89% of the theoretical yield.

*Example IV*

The procedure of Example I was followed utilizing the following reactants: 89 parts by weight of 1-nitropropane, 53.3 parts of formalin (37.5% HCHO) and 0.15 part of hydrated lime in 25 parts of water, the formalin being added over a period of one hour with the temperature maintained at 25° C. The mixture was then agitated for an additional 1½ hours at a temperature of 25° C. The lime was then precipitated by the addition of a slight excess of carbon dioxide, filtered, and the entire filtrate (two layers) distilled at a pressure of 150 mm. of mercury. After the removal of the more volatile constituents, the 2-nitro-1-butanol was distilled at a pressure of 10 mm. of mercury. A yield of 59 parts of 2-nitro-1-butanol was obtained, constituting 95% of the theoretical yield on the basis of the 1-nitropropane consumed. In addition, some 2-ethyl-2-nitro-1, 3-propanediol was formed.

*Example V*

The procedure of Example I was followed utilizing the following reactants: 51.5 parts by weight of 1-nitrobutane, 32 parts of formalin (37.5% HCHO) and 0.1 part of hydrated lime in 25 parts of water, the formalin being added at 30-35° C. over a period of ¾ hour. The mixture was then agitated for an additional 1¾ hours at 30-35° C. After removal of the catalyst as described in the preceding example, 22.4 parts of benzol were added to facilitate separation of the reaction mixture into two layers. Distillation of the upper layer gave 30.5 parts of 2-nitro-1-pentanol, a yield of 73% of the theoretical on the basis of the 1-nitrobutane consumed. In addition, a considerable amount of 2-propyl-2-nitro-1, 3-propanediol was formed.

It is to be understood, of course, that our invention is not to be construed as limited to the particular examples given above. The catalysts of the present invention are applicable generally to the production of nitrohydroxy compounds from nitroparaffins or substituted nitroparaffins, and aldehydes, or substituted aldehydes. Although the examples above are limited to the production of nitroglycols and nitroalcohols, these catalysts may be also used for the production of nitrotrihydroxy compounds. Likewise, the reaction may be effected in the presence of an auxiliary solvent in the manner previously described, and the procedure may be modified in numerous other respects without departing from the scope of our invention. In general, it may be said that any equivalents or modifications of procedure which would naturally occur to one skilled in the art are included in the scope of our invention.

Our invention now having been described, what we claim is:

1. In a process for the production of nitrohydroxy compounds by the reaction of nitroparaffins and aldehydes, the improvement which comprises effecting the reaction in the presence of a catalyst essentially comprising an hydroxide of an alkaline earth metal.

2. In a process for the production of nitrohydroxy compounds by the reaction of nitroparaffins and aldehydes, the improvement which comprises effecting the reaction in the presence of a catalyst essentially comprising an hydroxide of an alkaline earth metal, and at the conclusion of the reaction exactly neutralizing the catalyst with an acid which forms an insoluble salt of the alkaline earth metal and filtering to remove the resulting precipitate.

3. In a process for the production of nitrohydroxy compounds by the reaction of nitroparaffins and aldehydes, the improvement which comprises effecting the reaction in the presence of a catalyst essentially comprising an hydroxide of an alkaline earth metal, and at the conclusion of the reaction exactly neutralizing the catalyst by introducing the exact equivalent amount of a non-volatile acid which forms an insoluble salt of the alkaline earth metal and filtering to remove the resulting precipitate.

4. In a process for the production of nitrohydroxy compounds by the reaction of nitroparaffins and aldehydes, the improvement which comprises effecting the reaction in the presence of a catalyst essentially comprising an hydroxide of an alkaline earth metal, and at the conclusion of the reaction exactly neutralizing the catalyst by introducing a slight excess of carbon dioxide, and filtering to remove the resulting precipitate.

5. In a process for the production of nitrohydroxy compounds by the reaction of nitroparaffins and aldehydes, the improvement which comprises effecting the reaction in the presence of a catalyst essentially comprising barium hydroxide, and at the conclusion of the reaction adding an equivalent amount of an acid which forms an insoluble barium salt and filtering to remove the resulting precipitate.

6. In a process for the production of nitrohydroxy compounds by the reaction of nitroparaffins and aldehydes, the improvement which comprises effecting the reaction in the presence of a catalyst essentially comprising calcium hydroxide, and at the conclusion of the reaction adding an equivalent amount of an acid which forms an insoluble calcium salt and filtering to remove the resulting precipitate.

7. In a process for the production of nitrohydroxy compounds by the reaction of nitroparaffins and aldehydes, the improvement which comprises effecting the reaction in the presence of a catalyst essentially comprising strontium hydroxide, and at the conclusion of the reaction adding an equivalent amount of an acid which forms an insoluble strontium salt and filtering to remove the resulting precipitate.

8. In a process for the production of nitrohydroxy compounds by the reaction of nitroparaffins and aldehydes, the improvement which comprises effecting the reaction in the presence of a catalyst essentially comprising from 0.05% to 0.5% of an hydroxide of an alkaline earth metal based on the total weight of the reaction mixture.

9. In a process for the production of nitrohydroxy compounds by the reaction of nitroparaffins and aldehydes, the improvement which comprises effecting the reaction in the presence of a catalyst essentially comprising from 0.05% to 0.5% of a hydroxide of an alkaline earth metal based on the total weight of the reaction mixture, and at the conclusion of the reaction adding an equivalent amount of an acid which forms an insoluble salt of the alkaline earth metal and filtering to remove the resulting precipitate.

10. In a process for the production of nitrohydroxy compounds by the reaction of nitroparaffins having in excess of one carbon atom and aldehydes, the improvement which comprises effecting the reaction in the presence of a catalyst essentially comprising from 0.05% to 0.5% of calcium hydroxide based on the total weight of the reaction mixture, and at the conclusion of of the reaction introducing carbon dioxide to precipitate calcium carbonate and filtering to remove the resulting precipitate.

HENRY B. HASS.
BYRON M. VANDERBILT.